United States Patent
Zhou et al.

(10) Patent No.: US 11,047,500 B2
(45) Date of Patent: Jun. 29, 2021

(54) DUAL COIL SOLENOID VALVE FOR A FUEL GAS CONTROL VALVE AND THE CONTROL METHOD THEREOF

(71) Applicant: NINGBO RICHEN ELECTRICAL APPLIANCE CO., LTD, Ningbo (CN)

(72) Inventors: Yin Zhou, Ningbo (CN); Youbin Wang, Ningbo (CN)

(73) Assignee: NINGBO RICHEN ELECTRICAL APPLIANCE CO., LTD.

( * ) Notice: Subject to any disclaimer, the term of this patent is extended or adjusted under 35 U.S.C. 154(b) by 0 days.

(21) Appl. No.: 16/557,021

(22) Filed: Aug. 30, 2019

(65) Prior Publication Data
US 2020/0332915 A1   Oct. 22, 2020

(51) Int. Cl.
*F16K 31/06*   (2006.01)

(52) U.S. Cl.
CPC ...... *F16K 31/0679* (2013.01); *F16K 31/0655* (2013.01)

(58) Field of Classification Search
CPC .... F16K 31/0679; F16K 31/0655; H01F 6/00; H01F 7/066; H01F 7/1805; H01F 2007/086; H01F 2007/1692
See application file for complete search history.

(56) References Cited

U.S. PATENT DOCUMENTS

| | | | | |
|---|---|---|---|---|
| 618,702 A * | 1/1899 | Mason | ............... | H02K 33/18 310/27 |
| 5,476,079 A * | 12/1995 | Kanamori | ............ | F02M 51/005 123/458 |
| 6,561,138 B2 * | 5/2003 | Kobayashi | ............ | F23D 14/68 122/14.2 |
| 7,258,812 B2 * | 8/2007 | Shimada | ............... | H01F 1/26 148/104 |
| 8,681,468 B2 * | 3/2014 | Jacob | ................... | H01F 7/1805 361/154 |

FOREIGN PATENT DOCUMENTS

WO   WO-2014187195 A1 *  11/2014  ............ H01F 7/066

OTHER PUBLICATIONS

Translation of WO2014/187195A1.*

* cited by examiner

*Primary Examiner* — Eric Keasel
(74) *Attorney, Agent, or Firm* — Tarolli, Sundheim, Covell & Tummino LLP (57) ABSTRACT

A dual coil solenoid valve is disclosed for a fuel gas control valve, which comprises a stationary coil assembly and a moving coil assembly, wherein both the stationary coil assembly and the moving coil assembly consist of a magnetic core and a coil. Grooves are provided on the inside of the magnetic cores and coils are arranged in the grooves of the magnetic cores. The stationary coil assembly and the moving coil assembly have an equal cross-sectional area and are arranged oppositely with their axes coinciding with each other. The coils are arranged in the grooves of the magnet cores in such a way that the leakage flux can be reduced and the electromagnetic forces can be increased.

7 Claims, 6 Drawing Sheets

DUAL COIL SOLENOID VALVE FOR A FUEL GAS CONTROL VALVE AND THE CONTROL METHOD THEREOF

RELATED APPLICATIONS

The present invention is a Nonprovisional Application under 35 USC 111(a), claiming priority to Serial No. CN 201910306166.9, filed on 17 Apr. 2019 and CN 201920515866.4, filed on 17 Apr. 2019, the entirety of both of which are incorporated herein by reference.

TECHNICAL FIELD

The present invention relates to a solenoid valve, and in particular to a dual coil solenoid valve for a fuel gas control valve and a control method thereof.

BACKGROUND ART

An electromagnet is an electrical device which attracts a ferromagnetic substance and converts an electromagnetic energy into a mechanical energy after being electrified. After an electromagnet is used in a fuel gas control valve to form a solenoid valve, the opening and closing of the fuel gas valve can be realized by turning on and turning off the power of the solenoid valve, and the functions such as alarm and protection can also be realized. There are many types of electromagnets. However, they have the same basic composition and operational principle and usually consist of three major parts: coil, iron core and armature iron. The coil contains the iron core and, after being electrified, it generates magnetic forces to attract the armature iron. The material of the iron core is usually soft iron or silicon steel.

However, the solenoid valve of the prior art require a certain number of ampere-turns to produce a large enough attraction force, while owning to the size limitation, it is impossible to make a very large fuel gas control valve; therefore, the solenoid valve can work only when a large current is applied to the coils, and as a result, energy is consumed very quickly, and as the consumed energy is converted into heat energy, the magnet coils easily get hot after they work for a long time, which in turn accelerates the aging of related components on the solenoid valve or even damages them.

In addition, when the solenoid valve is used in a specific environment, for example, in an outdoor environment, where the mains power supply is unavailable or inconvenient and a battery needs to be used as a power supply, the limited energy stored in the battery cannot last long due to the large energy consumption, so the fuel gas control valve has application limitations.

SUMMARY OF THE INVENTION

(1) Technical Problem to be Solved

The technical problem to be solved by the present invention is to provide a dual coil solenoid valve for a fuel gas control valve, and the present invention can provide a very small current to the coils of the solenoid valve to maintain the attracted contact state of the solenoid valve, that is, the open state of the fuel gas control valve.

(2) Technical Solution

The technical solution adopted in the present invention to solve the above-mentioned technical problem is as follows: a dual coil solenoid valve for a fuel gas control valve, said dual coil solenoid valve comprising a stationary coil assembly and a moving coil assembly. Said stationary coil assembly comprises a stationary magnetic core and a stationary coil, said moving coil assembly comprises a moving magnetic core and a moving coil, said stationary coil assembly and said moving coil assembly have the same cross-sectional shape and area and are arranged oppositely with their axes coinciding with each other, said stationary magnetic core and moving magnetic core are E-shaped, that is, grooves are formed in said stationary magnetic core and moving magnetic core, and said stationary coil and moving coil are arranged in said grooves.

The coils on said stationary coil assembly and moving coil assembly are wound in the same direction according to their installation positions in said dual coil solenoid valve, that is, the direction of magnetism produced from said stationary magnetic core after said stationary coil is electrified is the same as the direction of magnetism produced from said moving magnetic core after said moving coil is electrified, and the magnetic poles produced by the matching sides between said stationary coil assembly and said moving coil assembly are opposite such that, according to the rule of opposite magnetic poles attracting each other, the magnetic forces produced by said stationary coil assembly and said moving coil assembly are superposed after said stationary coil assembly and said moving coil assembly are electrified.

In a further technical solution, in order to improve the magnetic conductivity and reduce the leakage flux, the material of said stationary magnetic core and said moving magnetic core is manganese-zinc ferrite with a high magnetic conductivity or a superconducting material.

In a further technical solution, said attracting current is 4~50 times the maintaining current, and said maintaining current is 2 mA~200 mA.

In a further technical solution, said stationary magnetic core and moving magnetic core can also be in the shape of a round jug and the grooves formed in said stationary magnetic core and moving magnetic core are annular grooves.

In a further technical solution, guide poles are arranged between said stationary coil assembly and said moving coil assembly so that the moving coil assembly can move along a straight line.

In a further technical solution, a push rod is arranged on said moving coil assembly, one end of said push rod is fixed onto said moving coil assembly, the other end is provided with a sealing cushion, and a spring is arranged between said sealing cushion and said moving coil assembly.

A control method of the dual coil solenoid valve for a fuel gas control valve comprises the following steps:

Step 1. Simultaneously apply a large attracting current which is 4~50 times the maintaining current to the stationary coils and moving coils so that the moving coil assembly moves along the axis to come into contact with the stationary coil assembly, and the moving coil assembly drives the push rod and the sealing cushion to compress the spring to separate the sealing cushion from the gas port.

Step 2. Keep the gas port of the fuel gas control valve in the open state, wherein, after the stationary coil assembly and moving coil assembly come into contact, the current in the stationary coil and moving coil can be reduced, and only a small maintaining current, which is usually 2 mA~200 mA, is needed to maintain the attracted contact state (namely, keep the fuel gas control valve always in the open state), and when the fuel gas control valve needs to be closed, only the power supply to the stationary coil and the moving coil needs to be cut off.

In a further technical solution, after the attracting current is applied to said stationary coil and moving coil, the current in the stationary coil and moving coil is reduced to said maintaining current, and ways to reduce the current include:

Way 1. only the current in one coil is reduced, that is, the current in the stationary coil or moving coil is reduced and the current in the other coil is still maintained at the original level;

Way 2. the power supply to one coil is directly cut off, that is, the power supply to the stationary coil or moving coil is cut off, and the current in the other coil is maintained at the original level;

Way 3. the current in the stationary coil and the moving coil is simultaneously reduced at a certain ratio;

Way 4. the power supply to one coil is directly cut off, that is, the power supply to the stationary coil or moving coil is cut off, and the current in the other coil is reduced.

(3) Advantageous Effects

Compared with the prior art, the present invention has the following advantageous effects:

The present invention provides a dual coil solenoid valve for a fuel gas control valve, wherein a current is simultaneously applied to the two coils, said magnetic cores are inside said coils, and said magnetic cores also surround said coils so that the magnetic flux in said magnetic cores is increased, and a large attraction force can be generated only by applying a small current, which results in a solenoid valve that has a low power consumption, a small size and a simple structure and is applicable to most fuel gas control valves.

Description of reference numerals in the drawings:
1—stationary coil assembly, 2—moving coil assembly, 3—guide pole, 4—push rod, 5—sealing cushion, 6—spring, 7—valve body, 11—stationary magnetic core, 12—stationary coil, 13—groove, 21—moving magnetic core, 22—moving coil, 71—gas port, 11'—jug-shaped magnetic core, 12'—jug-shaped magnetic core coil, 13'—annular groove

DETAILED DESCRIPTION OF THE INVENTION

The following further describes the present invention in combination with the drawings and embodiments. The following embodiments are used to describe the present invention, but not to restrict the scope of the present invention.

Embodiment 1

As shown in FIG. 1 to FIG. 7, a dual coil solenoid valve for s fuel gas control valve comprises a stationary coil assembly 1 and a moving coil assembly 2, said stationary coil assembly 1 comprises a stationary magnetic core 11 and a stationary coil 12, said moving coil assembly 2 comprises a moving magnetic core 21 and a moving coil 22, the materials of said stationary magnetic core 11 and moving magnetic core 21 are both a manganese-zinc ferrite with a high magnetic conductivity, said stationary magnetic core 11 and moving magnetic core 21 are both E-shaped, that is, a notched groove 13 is formed in said stationary magnetic core 11 and said moving magnetic core 21, said stationary coil 12 and moving coil 22 are respectively arranged in the grooves 13 in said stationary magnetic core 11 and moving magnetic core 21, the coils on said stationary coil assembly 1 and moving coil assembly 2 are wound in the same direction according to their installation positions in said dual coil solenoid valve, said stationary coil assembly 1 and said moving coil assembly 2 have the same cross-sectional shape and area and are arranged oppositely with their axes coinciding with each other, guide poles are arranged between said stationary coil assembly 1 and said moving coil assembly 2, said moving coil assembly 2 can move along the axis of the guide poles 3, a push rod 4 is arranged on said moving coil assembly 2, one end of said push rod 4 is fixed onto said moving coil assembly 2, the other end is provided with a sealing cushion 5, a spring 6 is arranged between said sealing cushion 5 and said moving coil assembly 2, and when said stationary coil assembly 1 and said moving coil assembly 2 do not come into contact, said sealing cushion 5 closes and seals the gas port 71 in the valve body 7.

When the dual coil solenoid valve works, a large attracting current is simultaneously applied to the stationary coil assembly 1 and the moving coil assembly 2, and since the coils on said stationary coil assembly 1 and moving coil assembly 2 are wound in the same direction according to the installation position in said dual coil solenoid valve, that is, the direction of magnetism produced from said stationary magnetic core 11 after said stationary coil 12 is electrified is the same as the direction of magnetism produced from said moving magnetic core 21 after said moving coil 22 is electrified, and the magnetic poles produced by the matching sides between said stationary coil assembly 1 and said moving coil assembly 2 are opposite. According to the rule of opposite magnetic poles attracting each other, the magnetic forces produced by said stationary coil assembly 1 and said moving coil assembly 2 are superposed to drive the moving coil assembly 2 to move along the guide poles and come into contact with the stationary coil assembly 1 after said stationary coil assembly 1 and said moving coil assembly 2 are electrified. The moving coil assembly 2 drives the push rod 4 and the sealing cushion 5 to compress the spring 6 to separate the sealing cushion from the gas port 71, and thus the fuel gas control valve is opened. After the moving coil assembly 2 contacts the stationary coil assembly 2, the current in the stationary coil 11 and moving coil 21 is reduced, and only a small maintaining current is needed to maintain the contact state, that is, keep the fuel gas control valve always in the open state. When the fuel gas control valve needs to be closed, only the power supply to the stationary coil 11 and the moving coil 21 needs to be cut off.

The attracting current is 4~50 times the maintaining current and said maintaining current is 2 mA~200 mA.

Embodiment 2

Figure 1:
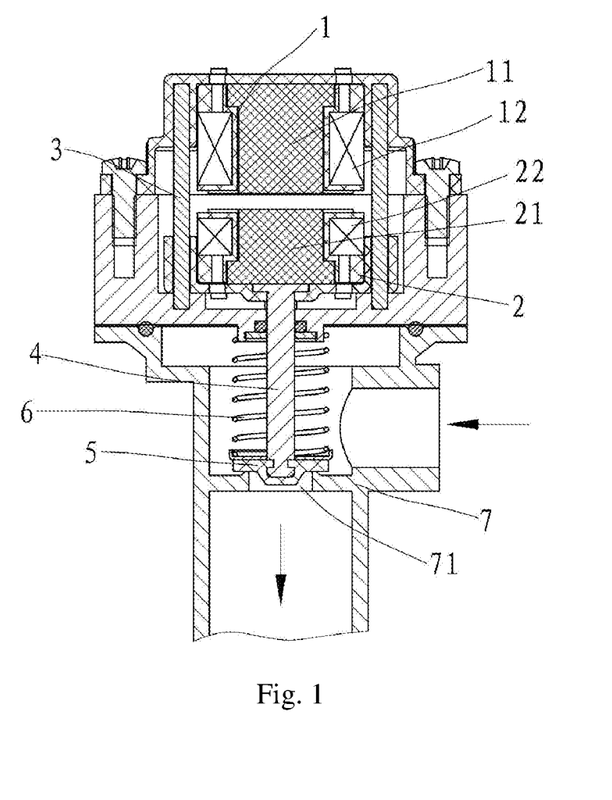
FIG. 1 is a cutaway view of embodiment 1 of the present invention.
Figure 2:
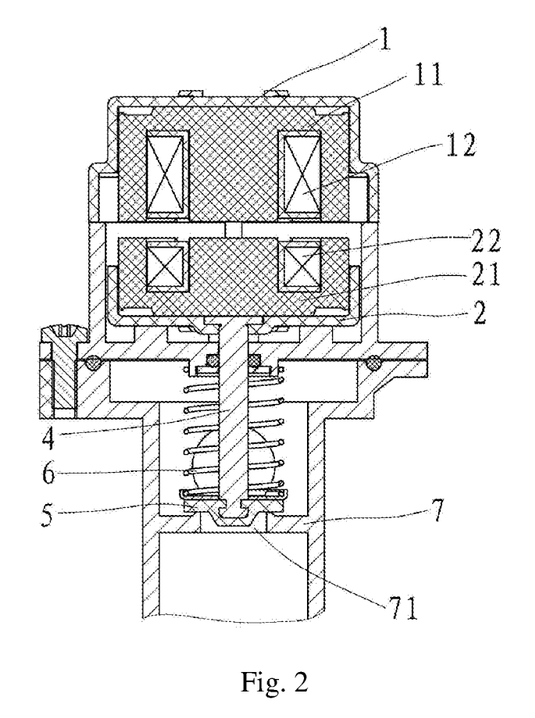
FIG. 2 is a cutaway view of embodiment 1 of the present invention after a rotation of 90 degrees relative to FIG. 1.
Figure 3:
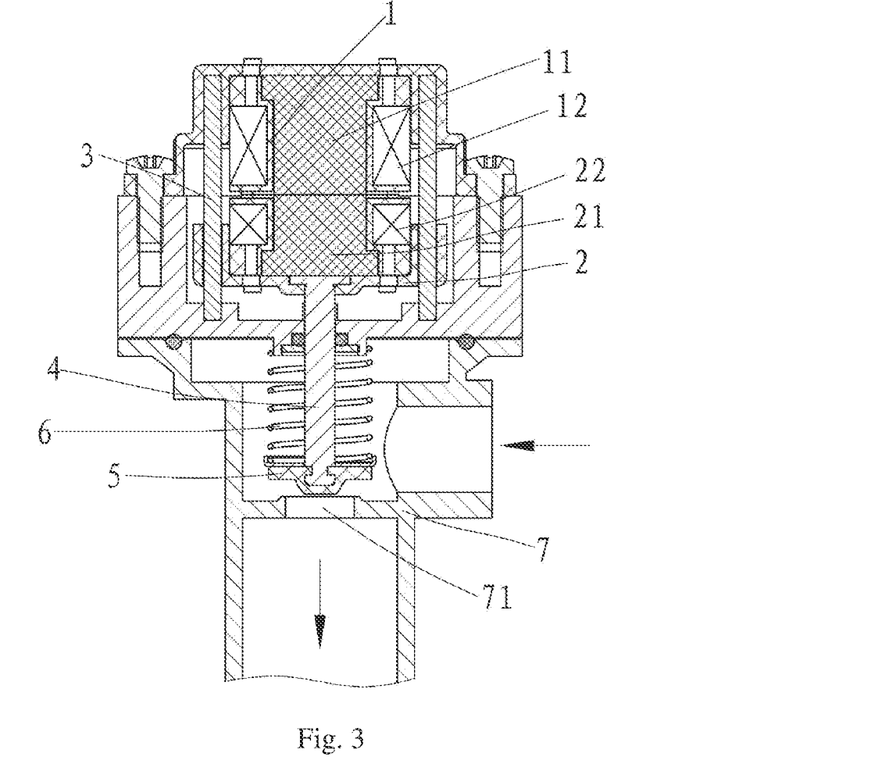
FIG. 3 is a cutaway view of embodiment 1 of the present invention after the stationary coil assembly and moving coil assembly come into contact.
Figure 4:
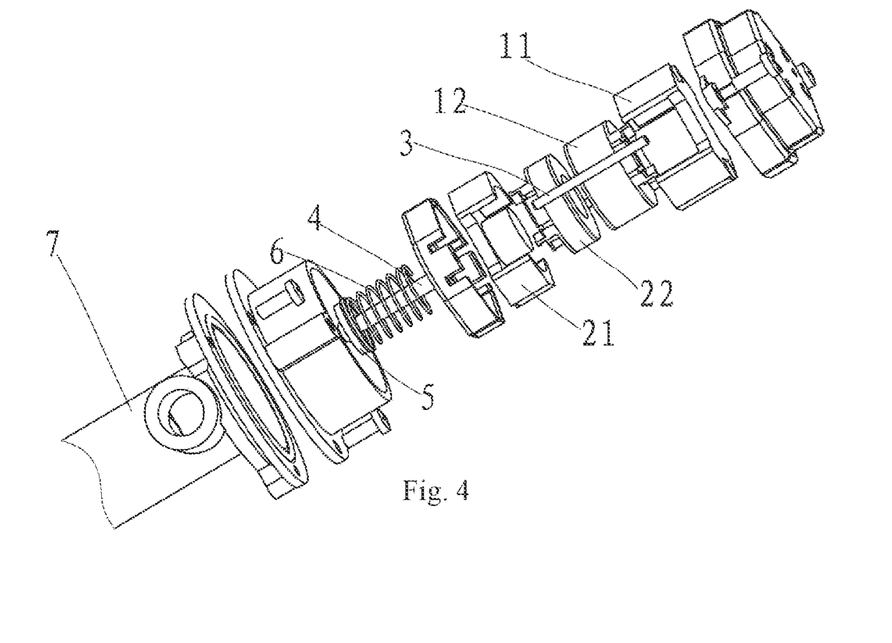
FIG. 4 is an exploded view of embodiment 1 of the present invention.
Figure 5:
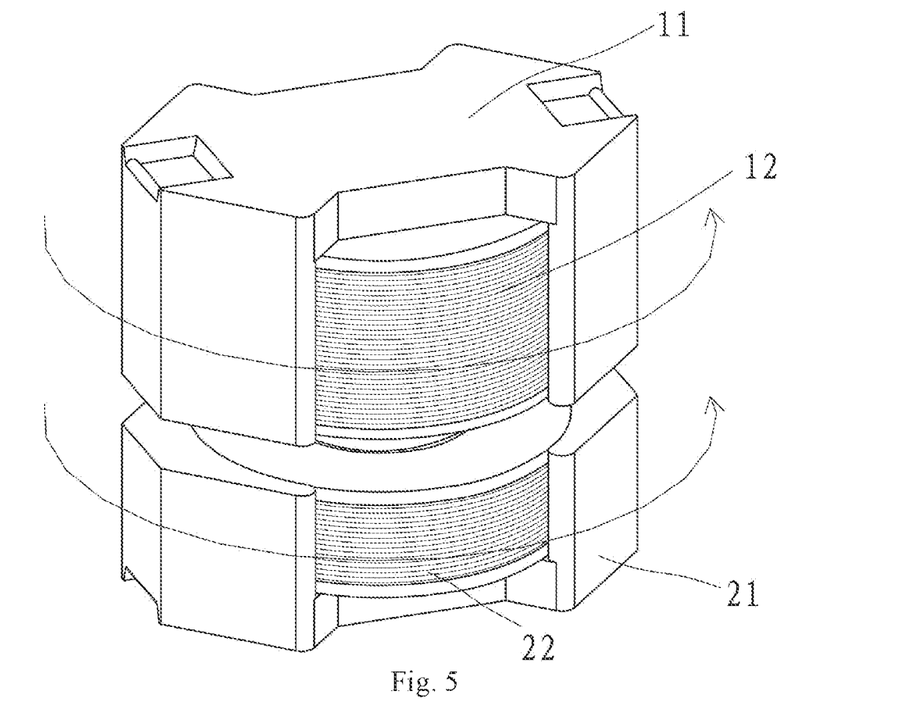
FIG. 5 shows the winding direction of the stationary coil assembly and moving coil assembly in embodiment 1 of the present invention.
Figure 6:
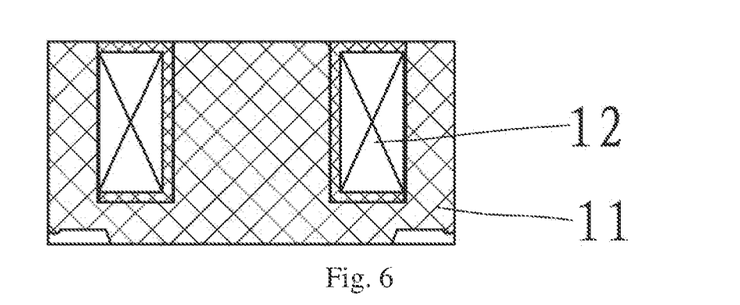
FIG. 6 is a cutaway view of the stationary coil assembly in embodiment 1 of the present invention.
Figure 7:
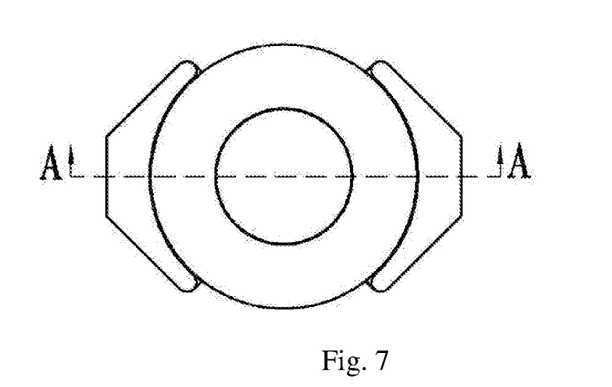
FIG. 7 shows the structure of the stationary coil assembly in embodiment 1 of the present invention.
Figure 8:
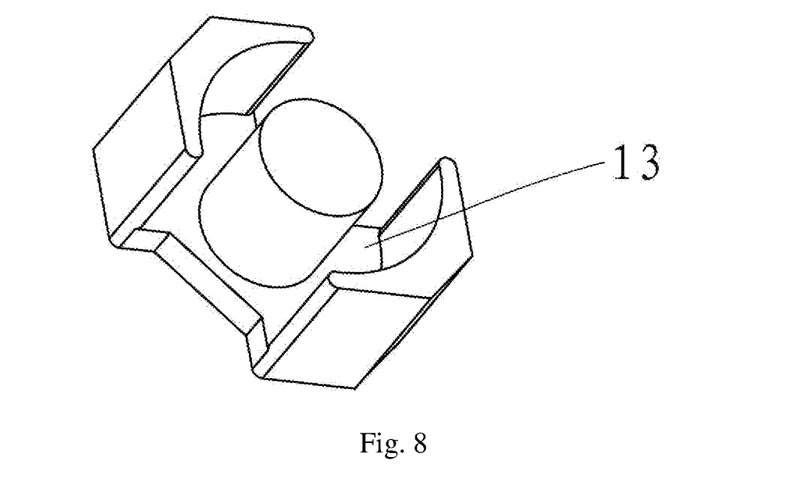
FIG. 8 shows the 3-D structure of the stationary coil assembly in embodiment 1 of the present invention.
Figure 9:
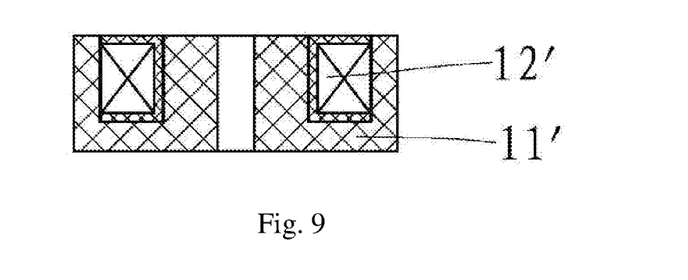
FIG. 9 is a cutaway view of the stationary coil assembly in embodiment 2 of the present invention.
Figure 10:
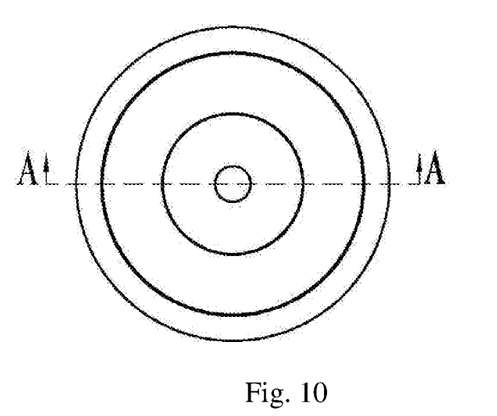
FIG. 10 shows the structure of the stationary coil assembly in embodiment 2 of the present invention.
Figure 11:
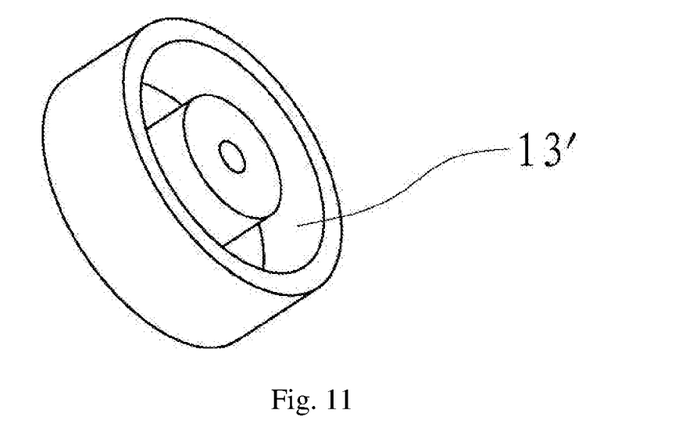
FIG. 11 shows the 3-D structure of the stationary coil assembly in embodiment 2 of the present invention.

As shown in FIG. 8 to FIG. 10, the magnetic core coil of the dual coil solenoid valve for a fuel gas control valve has another structure, wherein said magnetic core is a jug-shaped magnetic core 11', an annular groove 13' is provided in the jug-shaped magnetic core, and said jug-shaped magnetic core coil 12' is arranged in said annular groove 13'.

Only preferred embodiments of the present invention are described above, and it should be noted that those skilled in the art can make improvements and modifications without departing from the principle of the present invention, and that these improvements and modifications should also fall within the scope of protection of the present invention.

What is claimed is:

1. A dual coil solenoid valve for a fuel gas control valve, comprising a stationary coil assembly and a moving coil assembly, wherein said stationary coil assembly comprises a stationary magnetic core and a stationary coil, said moving coil assembly comprises a moving magnetic core and a moving coil, an inside of said stationary magnetic core comprises a groove provided thereon and an inside of said moving magnetic core comprises a groove provided thereon, said stationary coil is arranged in the groove of said stationary magnetic core, said moving coil is arranged in the groove of said moving magnetic core, and said stationary coil assembly and said moving coil assembly have the same cross-sectional shape and area and are arranged oppositely with their axes coinciding with each other;

each of said stationary magnetic core and said moving magnetic core comprises a bottom plate, a central column vertically extended upward from a central portion of the bottom plate, and a side wall vertically extended upward from a periphery of the bottom plate;

the bottom plate of said stationary magnetic core supports said stationary coil, the central column of said stationary magnetic core is inside said stationary coil, and the side wall of said stationary magnetic core surrounds said stationary coil;

the bottom plate of said moving magnetic core supports said moving coil, the central column of said moving magnetic core is inside said moving coil, and the side wall of said moving magnetic core surrounds said moving coil; and said stationary coil assembly and said moving coil assembly are arranged between two guide poles.

2. The dual coil solenoid valve for a fuel gas control valve as claimed in claim 1, characterized in that each side wall of said stationary magnetic core and moving magnetic core comprises a first wall and a second, opposite wall, or each side wall of said stationary magnetic core and moving magnetic core is an annular wall.

3. The dual coil solenoid valve for a fuel gas control valve as claimed in claim 2, characterized in that each first wall and each second wall of said stationary magnetic core and moving magnetic core has an arc inner surface and an outer surface having a central section and two side sections respectively extending from an end of the central section and bent inward.

4. The dual coil solenoid valve for a fuel gas control valve as claimed in claim 1, characterized in that the materials of said stationary magnetic core and moving magnetic core are both a manganese-zinc ferrite or a superconducting material.

5. The dual coil solenoid valve for a fuel gas control valve as claimed in claim 1, characterized in that an attracting current enabling said stationary coil assembly and said moving coil assembly to attract each other is 4~50 times a maintaining current for maintaining contact between said stationary coil assembly and said moving coil assembly, and said maintaining current is 2 mA-200 mA.

6. The dual coil solenoid valve for a fuel gas control valve as claimed in claim 1, characterized in that the grooves in said stationary magnetic core and moving magnetic core is notches or annular grooves.

7. The dual coil solenoid valve for a fuel gas control valve as claimed in claim 1, characterized in that a push rod is arranged on said moving coil assembly, one end of said push rod is fixed onto said moving coil assembly, the other end is provided with a sealing cushion, and a spring is arranged between said sealing cushion and said moving coil assembly.

* * * * *

UNITED STATES PATENT AND TRADEMARK OFFICE
CERTIFICATE OF CORRECTION

PATENT NO. : 11,047,500 B2  
APPLICATION NO. : 16/557021  
DATED : June 29, 2021  
INVENTOR(S) : Yin Zhou et al.

Page 1 of 1

It is certified that error appears in the above-identified patent and that said Letters Patent is hereby corrected as shown below:

On the Title Page

Item (30) Foreign Application Priority Data:  
Please add --CN 201910306166.9 filed on April 17, 2019-- and  
--CN 201920515866.4 filed on April 17, 2019--

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*